(12) United States Patent
Zhang

(10) Patent No.: US 9,002,264 B2
(45) Date of Patent: Apr. 7, 2015

(54) ANTENNA STRUCTURE FOR A NEAR-FIELD COMMUNICATION DEVICE

(75) Inventor: Andrew Zhang, Portland, OR (US)

(73) Assignee: Microsoft Technology Licensing, LLC, Redmond, WA (US)

(*) Notice: Subject to any disclaimer, the term of this patent is extended or adjusted under 35 U.S.C. 154(b) by 938 days.

(21) Appl. No.: 13/102,134

(22) Filed: May 6, 2011

(65) Prior Publication Data
US 2012/0282857 A1 Nov. 8, 2012

(51) Int. Cl.
| | | |
|---|---|---|
| *H04B 5/00* | (2006.01) | |
| *H04M 1/00* | (2006.01) | |
| *G08B 5/22* | (2006.01) | |
| *H04Q 1/30* | (2006.01) | |
| *G05B 11/01* | (2006.01) | |
| *G08C 19/16* | (2006.01) | |

(52) U.S. Cl.
CPC ............ *H04B 5/0037* (2013.01); *H04B 5/0031* (2013.01); *H04B 5/0068* (2013.01); *H04B 5/0081* (2013.01)

(58) Field of Classification Search
CPC ...... H04B 5/00; H04B 5/0031; H04B 5/0037; H04B 1/03; H04L 9/10
USPC .............. 455/41.1, 41.2, 550.1, 575.1, 575.5, 455/128, 347; 340/7.63, 12.55, 13.32
See application file for complete search history.

(56) References Cited

U.S. PATENT DOCUMENTS

| | | | |
|---|---|---|---|
| 7,689,195 | B2 | 3/2010 | Wu et al. |
| 7,766,237 | B2 | 8/2010 | Sakamoto et al. |
| 7,881,665 | B2 | 2/2011 | Symons |
| 2007/0008140 | A1 | 1/2007 | Saarisalo et al. |
| 2008/0207282 | A1* | 8/2008 | Schaffler .................... 455/575.3 |
| 2008/0238625 | A1 | 10/2008 | Rofougaran et al. |
| 2009/0088077 | A1 | 4/2009 | Brown et al. |
| 2009/0280753 | A1 | 11/2009 | Philip et al. |
| 2009/0309703 | A1* | 12/2009 | Forster ......................... 340/10.1 |
| 2010/0026590 | A1* | 2/2010 | Chiang et al. ................ 343/702 |
| 2010/0112941 | A1 | 5/2010 | Bangs et al. |
| 2010/0194334 | A1* | 8/2010 | Kirby et al. ................... 320/108 |
| 2010/0246143 | A1 | 9/2010 | Dinh et al. |
| 2011/0025575 | A1 | 2/2011 | Niederkorn et al. |
| 2011/0117838 | A1* | 5/2011 | Bosquet et al. .............. 455/41.1 |
| 2011/0248901 | A1* | 10/2011 | Alexopoulos et al. ........ 343/836 |
| 2012/0133543 | A1* | 5/2012 | Al-Khalefah et al. .......... 342/22 |
| 2013/0193209 | A1* | 8/2013 | Tsirline et al. ................ 235/449 |

OTHER PUBLICATIONS

"International Search Report", Mailed Jul. 31, 2012, Application No. PCT/US2012/036031, Filed Date May 2, 2012, pp. 8.
Liu, et al., "An UHF Reader Antenna Design for Near-field RFID Applications", Retrieved at <<http://ieeexplore.ieee.org/stamp/stamp.jsp?tp=&arnumber=5385466>>, Asia Pacific Microwave Conference, Dec. 7-10, 2009, pp. 2394-2397.
Jing, Hengzhen., "Direct antenna modulations for UWB pulse transmission and near field communications", Retrieved at <<http://gradworks.umi.com/33/63/3363923.html>>, Dec. 2009, pp. 2.

* cited by examiner

*Primary Examiner* — Andrew Wendell
(74) *Attorney, Agent, or Firm* — Ladislav Kusnyer; Judy Yee; Micky Minhas

(57) ABSTRACT

A near field communication (NFC) communicator includes a housing, an NFC controller and an antenna circuit located in the housing. The antenna circuit enable inductive coupling of a near field electromagnetic signal with another antenna circuit in near field range. The antenna circuit includes an antenna element to generate the electromagnetic signal. The communicator also includes a receiver circuit located in the housing for extracting data from modulation induced in the electromagnetic signal which is caused by the inductive coupling of the near field electromagnetic signal with another antenna circuit, a transmitter circuit to generate the near field, a load modulator to modulate the near field to the reader and an energy harvesting circuit to power the rest of the circuit from the external field. A ferrite sheet is located in the housing such that a gap is maintained between the antenna element and the ferrite sheet.

20 Claims, 6 Drawing Sheets

ANTENNA STRUCTURE FOR A NEAR-FIELD COMMUNICATION DEVICE

BACKGROUND

Near field RF (radio frequency) communication requires an antenna of one near field RF communicator to be present within the alternating magnetic field (H field) generated by the antenna of another near field RF communicator by transmission of an RF signal (for example a 13.56 Mega Hertz signal) to enable the magnetic field (H field) of the RF signal to be inductively coupled between the communicators. The RF signal may be modulated to enable communication of control and/or other data. Ranges of up to a couple of centimeters are common for near field RF communicators.

Near field RF communication may be referred to as near-field communication (NFC). NFC communicators are capable of both initiating a near field communication (through transmission or generation of an alternating magnetic field) with another NFC communicator and of responding to initiation of near field communication by another NFC communicator. An NFC communicator may operate in a "reader" or "initiator" mode in which the NFC communicator seeks to initiate near field communication or in a "tag" or "target" mode in which the NFC communicator is receptive to initiation of near field RF communication. An initiator NFC communicator will generate an RF field and a target NFC communicator will respond by modulation of the received field, usually by load modulation. Examples of near field RF communicators are defined in various standards such as ISO/IEC 18092, ISO/IEC 14443, ISO/IEC 15693 ISO/IEC 21481, for example. Examples of NFC communicators can be found in ISO/IEC 18092 and ISO/IEC 21481 in particular.

NFC communicators may be provided as standalone or discrete devices or they may be incorporated within or coupled to larger electrical devices or host devices to enable those devices to communicate using NFC with other NFC communicators or devices incorporating or coupled to such near field RF communicators. When incorporated within a larger device or host, an NFC communicator may be a discrete entity or may be provided by functionality within the larger device or host. Examples of such larger or host devices are mobile telephones, portable computing devices (such as personal digital assistants, notebooks, laptops), other computing devices such as personal or desktop computers, computer peripherals such as printers, or other electrical devices such as portable audio and/or video players or other media players, CD players and DVD players. Other examples of such larger or host devices are consumer electronic products such as domestic appliances or personal care products, and other electrical or electronic devices, apparatus or systems. Some areas of application are payment systems, ticketing systems, for example in tickets (e.g., parking tickets, bus tickets, train tickets or entrance permits or tickets) or in ticket checking systems, toys, games, posters, packaging, advertising material, product inventory checking systems and so on.

NFC communicators need to be capable of both initiating an RF H field and of receiving an RF H field. Moreover a single NFC communicator design may be used for many different applications and in some of those applications the NFC communicator may function like an NFC reader and in other applications the NFC communicator may sometimes function like an NFC tag and in other cases it may function as both an NFC reader and an NFC tag, or peer to peer mode. The antenna circuit used in an NFC communicator can be designed to be optimized for use as a reader (to enable initiation or generation of an RF H field and to detect modulation or affects on that initiated RF H field) or as a tag (to receive an RF H field and to modulate that H field, for example by load modulation). However, due to conflicting requirements it is generally difficult to optimize it for both functions.

More particularly, when the communicator is used as an initiator, it is desirable to generate as much energy as possible at the transmitting frequency. In this way the distance at which the initiator can sense the tag can be maximized. This requires the NFC antenna to have very high quality factor (e.g., Q factor). However, if this same device is used as a tag, it needs to load modulate the signal. Load modulation (which is AM modulation in the case of NFC) creates two side bands around the carrier frequency. However, if the antenna element has a high quality factor, it will suppress the side-band signals. As a result, for a given antenna, the receiving (tag) performance is a trade off from the transmitting (reader) performance.

One important test of reader performance is the strength of the H field that is generated, whereas an important test of tag performance is how much the voltage of a reader is be pulled down (i.e., load modulated). Of course, one ultimate performance parameter is the maximum distance at which the reader or initiator can read a tag.

SUMMARY

The effective communication range of an NFC communicator can be increased when the device is used both as a reader and as tag by properly arranging the material components used in the vicinity of the antenna. In particular, a ferrite sheet that is used to prevent the generation of eddy currents by the antenna coil or element can adversely affect antenna performance. In one implementation, a gap or spacing is created between the antenna element and the ferrite sheet. The presence of the gap reduces the abruptness with which the magnetic field generated by the antenna is terminated by the ferrite sheet, thereby improving antenna performance.

In one particular implementation, a nonmetallic porous material is provided in the gap to mechanically maintain separation between the antenna element and the ferrite sheet. The porous material prevents eddy currents generated by the H field within the metal shielding, which protects the printed circuit board on which the active elements are located, from electromagnetic interference (EMI). In some cases the nonmetallic porous material is a urethane or polyurethane foam.

This summary is provided to introduce simplified concepts for managing an immerse environment that are further described below in the Detailed Description. This summary is not intended to identify essential features of the claimed subject matter, nor is it intended for use in determining the scope of the claimed subject matter.

DETAILED DESCRIPTION

It should be noted at the outset that in general, any functional block diagrams shown in the figures are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these.

Figure 1:
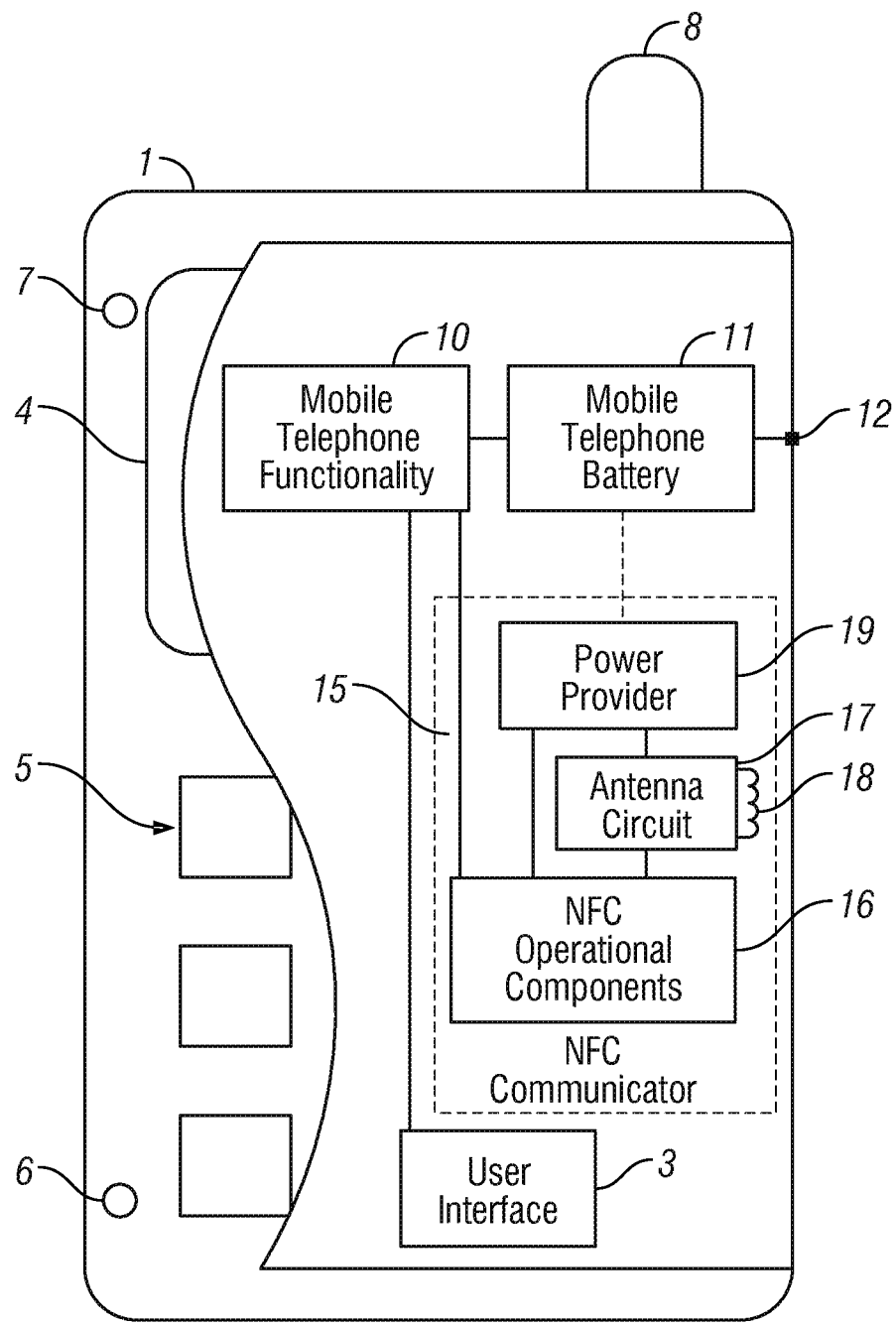
FIG. 1 shows a functional block diagram illustrating an NFC communications-enabled device.

Referring now specifically to FIG. 1, there is shown a representational diagram illustrating an NFC communications-enabled device. In this example the NFC communications-enabled device is a mobile communication device. More generally, however, the methods, devices and techniques described herein are applicable to a wide variety of host devices that include but are not limited to the illustrative mobile communication device. For example, other such host devices include, without limitation, cellular telephones or other mobile communication devices that wirelessly communicate over a wireless communications network, PCS handset devices, personal digital assistants, portable media players and portable computers (e.g., notebooks and netbooks) and game consoles. Accordingly, references to mobile communication devices in the description to follow are merely illustrative.

The NFC communications-enabled device 1 includes conventional features of a mobile telephone including mobile telephone functional components 10 (in the form of, usually, a radio transmitter and receiver for respectively sending and receiving RF signals over a wireless communication network, a programmed controller, generally a processor or microprocessor with associated memory or data storage, for controlling operation of the mobile telephone in combination with a SIM card), an antenna 8 for enabling connection to a mobile telecommunications network, and a user interface 3 with a display 4, a keypad 5, a microphone 6 for receiving user voice input and a loudspeaker 7 for outputting received audio to the user. The mobile telephone also has a chargeable battery 11 coupled to a charging socket 12 via which an adapter (not shown) may be connected to enable charging of the battery 11. Although FIG. 1 shows a standalone mobile communication device (e.g., a cellphone), the mobile telephone functionality may be incorporated in or associated with another host device such as a notebook, laptop or PDA, for example.

In addition, as shown in FIG. 1 NFC communications-enabled device 1 includes an NFC communicator 15. As shown, the NFC communicator 15 is incorporated within the larger device and, as with the other functional blocks, may be discrete entities within the host devices or may be provided by features dispersed throughout or integrated within the host device or a part of the host device.

The NFC communicator 15 comprises NFC operational components 16 for, as will be described below, enabling control of the NFC functionality and generation, modulation and demodulation of an RF signal. The NFC communicator 15 also comprises an antenna circuit 17 comprising an inductor or coil in the form of an antenna element 18. The antenna circuit 17 enables an alternating magnetic field (RF H field) generated by the antenna of the near field RF communicator 15 by transmission of an RF signal (for example a 13.56 Mega Hertz signal) to be inductively coupled to the antenna of another communicator when that antenna is within the near field of the RF signal generated by the NFC communicator 15.

The NFC communicator is coupled to the mobile telephone and portable computer functionality 10 to enable data and/or control commands to be sent between the NFC communicator and the host device and to enable user input to the NFC communicator. Communication between the user interface 3 and the NFC communicator 15 is via the host device functionality 10.

The NFC communicator 15 also includes a power source 19. The power source 19 may be power supplies within the host device or specific to the NFC communicator 15 such as, for example a button cell battery, or other small battery. As another possibility or additionally as shown by dashed lines in FIG. 1, the power supply 19 may simply comprise a coupling to derive power from the corresponding device battery 11.

Figure 2:
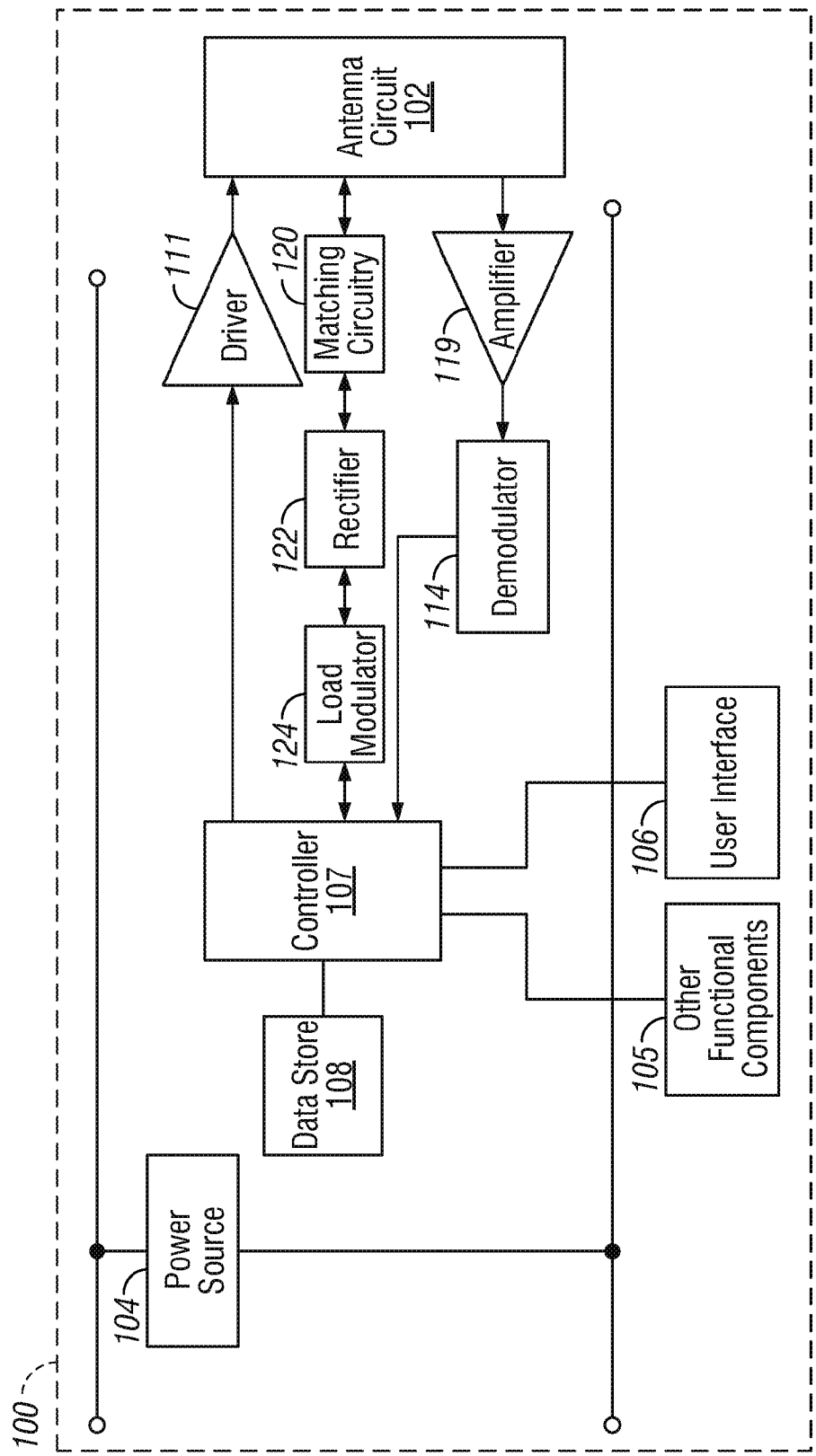
FIG. 2 shows a functional block diagram of the NFC operational components shown in FIG. 1.

FIG. 2 shows a functional block diagram of the NFC operational components 16 shown in FIG. 1. In this example the NFC operational components 100 includes an antenna circuit 102, power source 104, controller 107, data store 108, load modulator circuitry, receiver circuitry and transmitter circuitry. The NFC operational components 100 may or may not also have or be capable of being connected or coupled with other functional components 105 (for example the functionality of a host device such as described above) and a user interface 106.

In this example, the receiver circuitry includes an amplifier 119 coupled to the antenna circuit 102 and a demodulator 114 coupled to the amplifier 119, which respectively amplify and demodulate a modulated RF signal inductively coupled to the antenna circuit 102 from another NFC communicator in near field range and for supplying the thus-extracted data to the controller 107 for processing. The transmitter circuitry includes components for driving the antenna circuit 102 to transmit an RF signal. As shown in FIG. 2, the transmitter circuitry includes a driver 111 coupled to the antenna circuit 102. The controller 107 is provided to control overall operation of the NFC communicator. The controller 107 is coupled to the data store 108, which is provided to store control and other data. Program instructions for programming the controller and/or control data for communication to another near field RF communicator may be stored in an internal memory of the controller and/or the data store 108.

The NFC communicator may operate in an initiator mode (that is, as an initiating near field RF communicator) or a target mode (that is, as a responding near field RF communicator), depending on the mode to which the NFC communicator is set. The mode may be determined by the controller 107 or may be determined by the nature of a received near field RF signal. When in initiator mode, the NFC communicator initiates communications with any compatible responding near field RF communicator capable of responding to the initiating NFC communicator (e.g., an NFC communicator in target mode or an NFC tag) that is in its near field range, while when in target mode an NFC communicator waits for a communication from a compatible initiating near field RF communicator (e.g., an NFC communicator in initiator mode or an NFC reader or initiator). Compatible devices are operable at the same frequency and in accordance with the same protocols, for example in accordance with the protocols set out in various standards such as ISO/IEC 18092, ISO/IEC 21481, ISO/IEC 14443 and ISO/IEC 15693.

The load modulation circuitry is used when the NFC communicator is operating in target mode. The load modulation circuitry includes a matching circuit 120 coupled to the antenna circuit 102 and a rectifier 122 coupled to the matching circuit 120, which respectively impedance match and rectify the field from an initiating NFC communicator. The load modulation circuitry also includes a load modulator 124 that couples the matching circuit 122 to the controller 107. The load modulator 124 loads down the field being received from the initiating NFC communicator under the control of controller 107. In this way the controller can control the data pattern and data rate communicated to the initiating NFC communicator. The load modulator 124 is also used to extract or harvest energy from the field being received, which is used to power the device when operating as a tag.

Of course, short-range communication technologies other than NFC may be employed to establish communication between a reader and a tag. Such short-range communication technologies may be incorporated in standards or proprietary. One example of a proprietary technology is the Sony TransferJet™, which employs a powered data tag that can store more information than an NFC tag.

As noted above, in FIG. 2 control of the operation of the NFC communicator is through controller 107. As another possibility, where the NFC communicator is part of or associated with a host device, control of the operation of the NFC communicator may at least partly be directed by the host device, for example through the other functional components 105. In such circumstances all or part of the control may be provided by the other functional components 105 which may be part of the NFC functional components or the components of a host. For example the NFC communicator controller 107 may control modulation and modulation protocols whereas the data to be transmitted may be provided by the other functional components 105.

Figure 3:
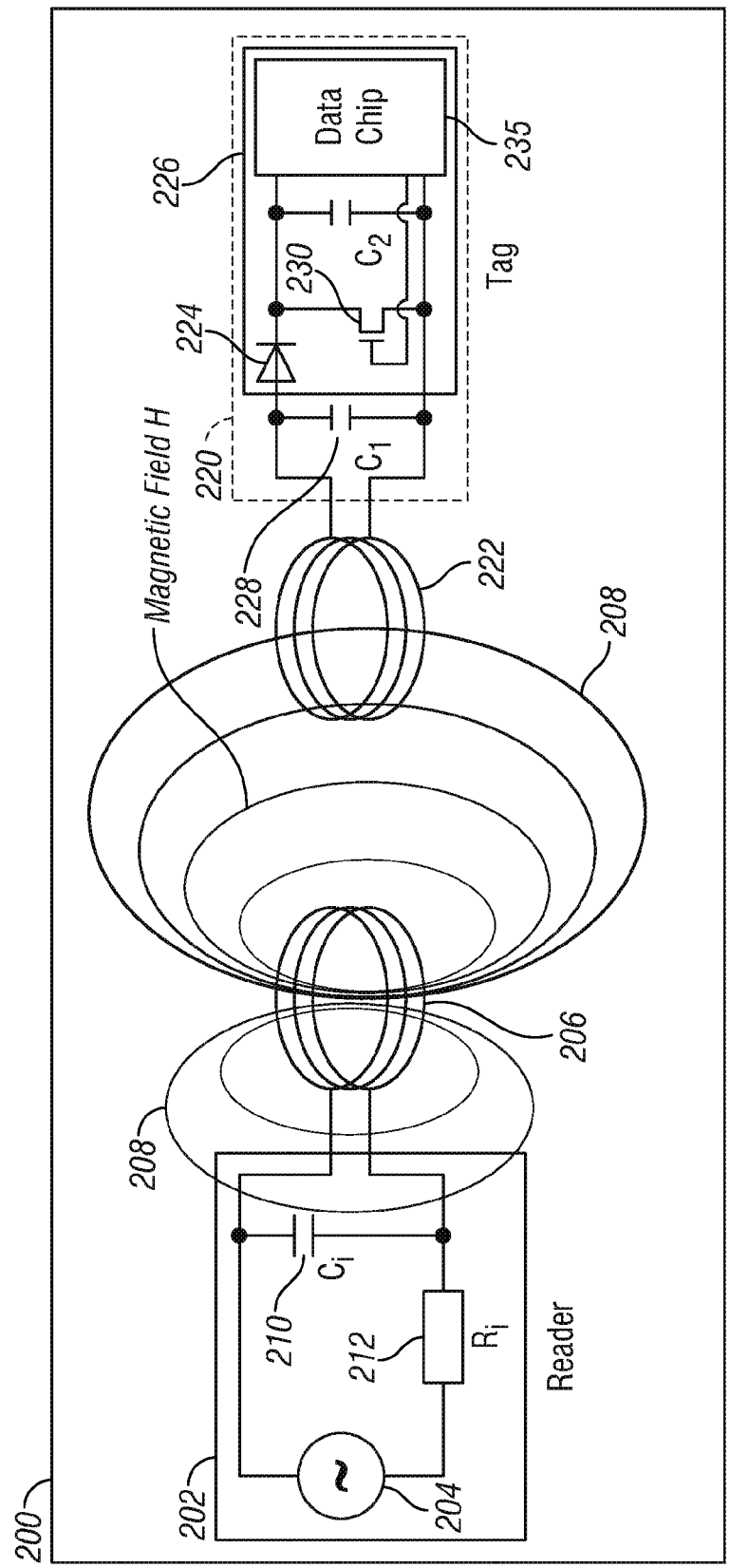
FIG. 3 shows a functional block diagram of one example of the antenna circuit shown in FIG. 2.

FIG. 3 shows the components of one example of the antenna circuit 102 of FIG. 2. In this example the components are shown which are employed when the NFC communicator is used as a reader 202 and as an NFC tag 220. Of course, some of the components that are depicted, such as antenna coils 206 and 222, are common regardless of the mode in which the NFC communicator operates.

The reader 202 includes an AC power source 204 connected to the reader's antenna coil or antenna element 206, which generates a high frequency electromagnetic field in the area around the reader's antenna element 206. The strength of the field depends on, among other things, the power source and the size and number of turns in the coil. The capacitor 210 connected in parallel with the reader's antenna coil or antenna element 106 and the internal resistance 212 form an RLC oscillator that establishes a resonant circuit with a frequency that corresponds to the transmission frequency of the reader 202. Because the wavelength of the frequency used is several times greater than the close proximity distance between the reader's antenna element 206 and the tag's antenna coil or antenna element 222, the electromagnetic field can be treated as an alternating magnetic field 208. This region of close proximity is referred to as the near field region. The two antennas are linked by their mutual inductance, as in a transformer, with the primary coil or element being the reader's antenna element 206 and the secondary coil being the tag's antenna coil element. The alternating magnetic field 208 penetrates the tag's antenna coil or antenna element 222 when it is in the near field region, inducing an alternating current in the tag's antenna element 222. In this example the alternating current is rectified by the diode 224 in load modulator 226. The rectified current can serve as the power supply to the data chip 226, which stores the data for the tag 220.

The tag's antenna element 222, the capacitor 228, and the load resistance of the data chip 226 form an RLC oscillator establishing a resonant circuit tuned to the transmission frequency of the reader 202. When the resonant frequency of the tag 220 approximately corresponds (or is higher in the usual case) to the transmission frequency of the reader 202, this draws energy from the magnetic field 208. This additional power consumption manifests itself in the reader 202 as a voltage drop across the internal resistance 212 in the reader 202 through the supply current to the reader's antenna element 206. The data chip 226 controls the gate of FET 230 to switch the FET 230 between its on state and its off state, thereby controlling the data pattern and data rate of the load modulation that is sensed by the reader 202. That is, when the FET 230 is switched on and off, the load resistance of the tag changes, which would load the H field and only affect the amplitude of the reader's electromagnetic signal. If the data chip 226 switches its variable load resistance on and off using FET 230, it loads down the magnetic H field of the reader, causing the signal to be amplitude modulated. This modulation is then detected as a voltage change across the internal resistance 212 in the reader 202. In this manner, the data chip 226 can use its stored data to modulate the load resistance on the tag's antenna element 222 and transfer its stored data from the tag 220 to the reader 202.

Figure 4:
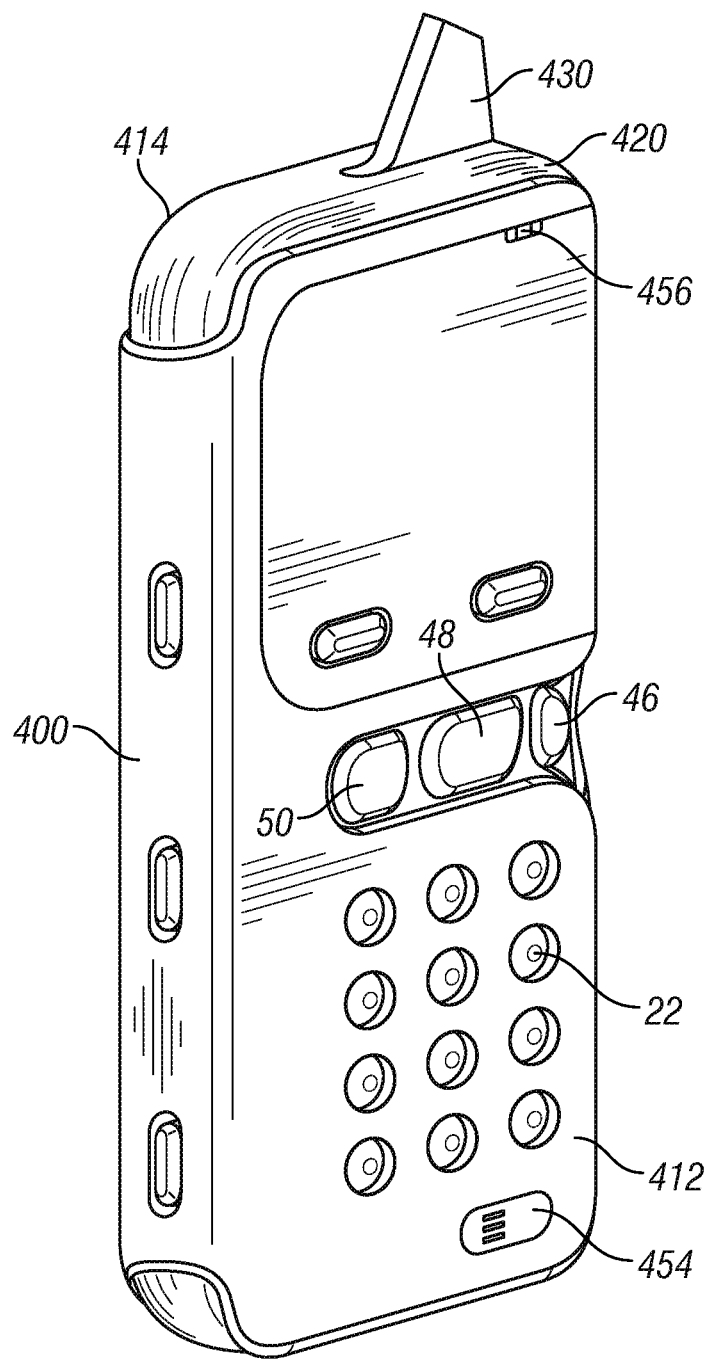
FIG. 4 shows one example of the physical design of an NFC communications-enabled device.

FIG. 4 shows one example of the physical design of an NFC communications-enabled device 400. Continuing with the example presented above, the device 400 is configured as a mobile communications device. Of course, more generally, the NFC communications-enabled device 400 may be any host device such as those mentioned above. The NFC communications-enabled device 400 may also be a standalone NFC communicator. NFC communications-enabled device 400 includes a housing 420 that is configured as appropriate for the type of device it incorporates, which in this case is a mobile communications device. The housing 420 may be formed, for example, from a rigid shell having a front face 412 and a back face 414 connected to a side portion 416. As shown, a plurality of keypad buttons 422 is located on the front face 412 of the housing 420. In some configurations, mobile communications device 400 may include various input buttons in addition to keypad buttons. In this example buttons 446, 448 and 450 are disposed at a mid-portion of the front face 412 of the housing 420 A speaker 454 and microphone 456 are also shown in the front face 412 of the housing 420. In addition, a protruding portion of antenna element 430 is visible.

In NFC systems, the already short effective communication range of the device may be further limited by the configuration or composition of the structure in which it is embedded. Certain materials may interfere with radio frequency waves, requiring a user to come closer to the tag in order to make contact.

Figure 5:
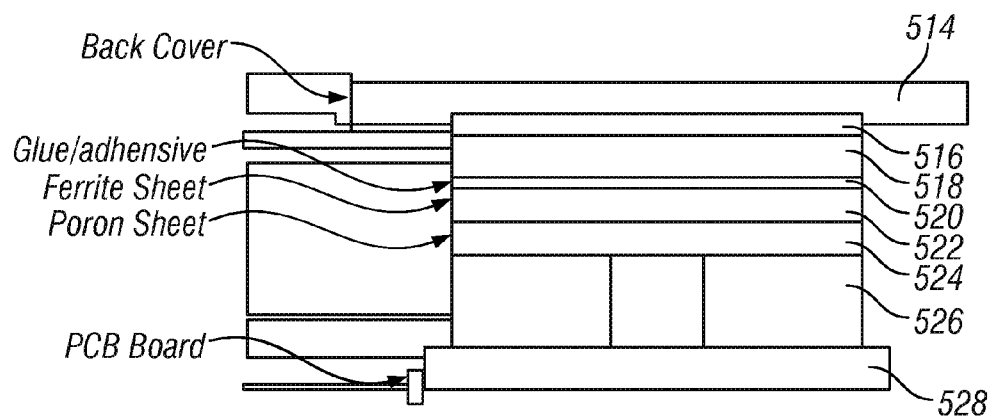
FIG. 5 is a cross-sectional view through a conventional NFC communications-enabled device

FIG. 5 is a cross-sectional view through a conventional NFC communications-enabled device 500 such as the device 400 shown in FIG. 4. The figure shows the back face 514 of the device housing, similar to back face 414 shown in FIG. 4. An antenna coil or antenna element 518 is located within the housing and is attached to the back face 514 of the housing using an adhesive or glue 516. The printed circuit board (PCB) that contains the active components of the device is shielded by a number of different materials. In particular, an electromagnetic interference (EMI) shielding structure 526, also known as a shielding or RF can, is generally provided over the PCB. The shielding structure 526 is electrically and mechanically attached to the PCB 528 and is generally formed from an electrically conductive material such as sheet metal or mesh metal.

As further shown in FIG. 5, a ferrite sheet 522 is typically secured to the antenna 516 using adhesive or glue 520. In this way both the antenna 518 and the ferrite sheet 522 are secured to the back face 514 of the housing. The ferrite sheet 522 serves to block the magnetic field generated by the antenna 518 so that eddy currents are not generated in the metal shielding 526, which can adversely impact the operation of the device 500. Finally, a highly compressible sheet 524 is located between the ferrite sheet 522 and the shielding structure 526 to provide impact protection.

The performance parameters of a conventional communications-enabled device 500 as described above can be described in terms of its load modulation amplitude and its maximum reader range. The maximum reader range characterizes the performance of the device when used as a reader and represents the maximum distance at which the reader can read data from a tag. The load modulation amplitude characterizes the performance of the device when used as a tag and is defined as the voltage decrease in the H field of a reader which is caused by the tag. Current NFC communicators can achieve a maximum reader range of about 2 cm and a load modulation amplitude of about 18 mV at a (x,y,z) position of (0,0,0). Another performance parameter that may be used to characterize an NFC reader is the field strength, which for the aforementioned conventional device is about 1.5 A/m at a distance 1 cm.

One problem with the aforementioned arrangement is that the ferrite sheet causes an abrupt termination of the H field generated by the antenna, which results in the energy from the field being dissipated in the ferrite sheet. This has been found to adversely affect antenna performance. It has also been found that the negative impact of this arrangement can be ameliorated by creating a gap between the antenna and the ferrite sheet. In this way the H field generated by the antenna is not abruptly terminated and the energy in the H field can traverse the gap without substantial dissipation. This significantly boosts the antenna quality factor and improves its performance.

Figure 6:
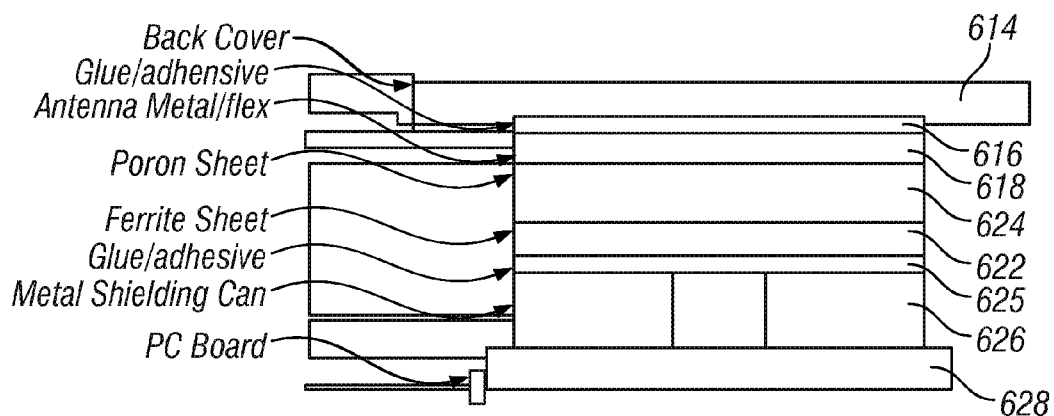
FIG. 6 is a cross-sectional view through an NFC communications-enabled device.

FIG. 6 is a cross-sectional view through an NFC communications-enabled device 600 that overcomes the aforementioned problems associated with a conventional device such as shown in FIG. 5. The figures shows the back face 614 of the device housing, similar to back face 14 shown in FIG. 4. An antenna coil 618 is located within the housing and is attached to the back face 614 of the housing using adhesive or glue 616. The printed circuit board (PCB) 628 that contains the active components of the device is shielded by a number of different materials. In particular, an EMI shielding structure 626 is generally provided over the PCB 628. The shielding structure 626 is electrically and mechanically attached to the PCB 628 and is generally formed from an electrically conductive material such as sheet metal or mesh metal. In some implementations the shielding structure 626 is attached to ground pads or traces at various points on the PCB 628. In addition, a high magnetic permeability sheet 622 such as a ferrite sheet is located between the antenna 618 and the EMI shielding structure 626. The high magnetic permeability sheet may be secured to the metal shielding structure 626 by adhesive or glue 625.

However, in contrast to the arrangement depicted in FIG. 5, in FIG. 6 a gap is established between antenna element 618 and the high magnetic permeability sheet 622. The H field can now traverse the gap so that the H field can form a closed loop encompassing the both gap and the antenna element. The gap is sufficiently wide so that energy from the H field is not dissipated in the ferrite sheet. As a result, the generation of eddy currents in the high magnetic permeability sheet 622 by the energy in the H field is substantially reduced or even eliminated.

The mechanical support necessary to maintain the gap is provided by a highly compressible sheet 624 that is located in the gap and which also offers impact protection In some implementations the highly compressible sheet 624 may be formed from a porous non-metallic and/or nonconductive material or foam such as a urethane or polyurethane foam, one example of which is a microcellular polyurethane material. One particular example of such a material is commercially available from the Rogers Corp. under the tradename Poron®.

Figure 7:
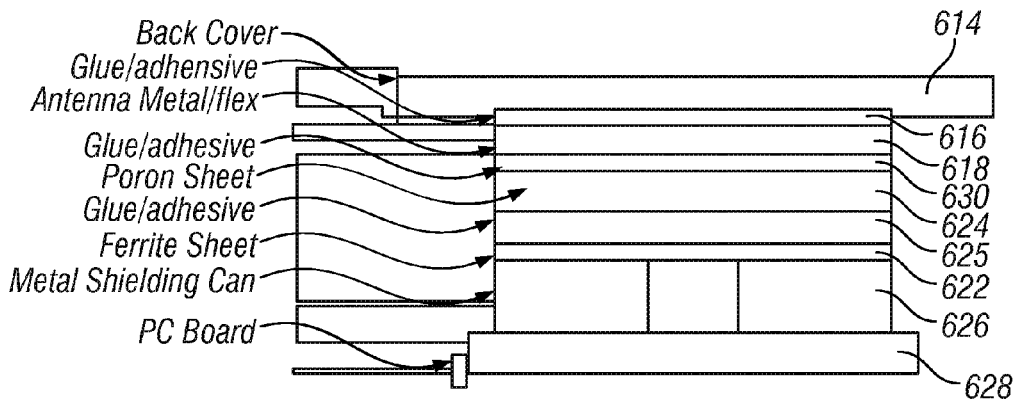
FIGS. 7 and 8 are cross-sectional views through alternative implementations of the NFC communications-enabled device.
Figure 8:
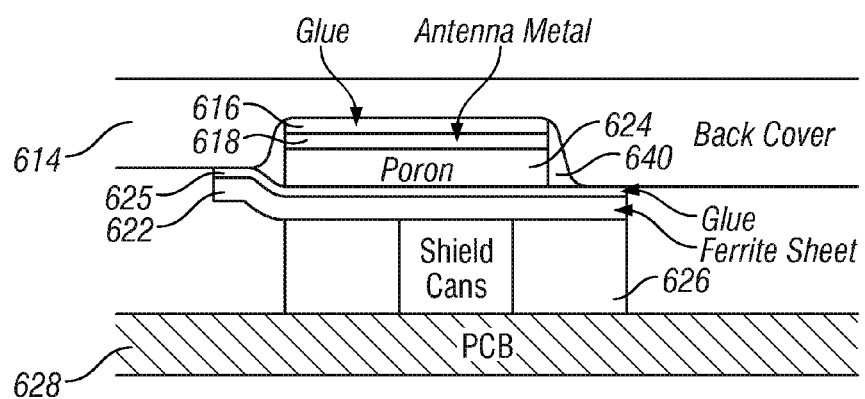

If adhesive or glue 625 is not employed to secure the high magnetic permeability sheet 622 to shielding structure 626, an adhesive or glue layer may be employed to secure the high magnetic permeability sheet 622 to highly compressible sheet 624. Such an arrangement is shown in FIG. 7, in which like elements have the same reference numerals as like elements in FIG. 6, with an additional adhesive or glue 630. FIG. 8 shows another implementation in which antenna element 618 is located in a recess 640 in the back cover 614. In this case the high magnetic permeability sheet 622 laterally extends beyond the antenna element 618 and the highly compressible sheet 624. The high magnetic permeability sheet 622 is directly secured to back cover 614 by adhesive or glue 625. The performance parameters of the communications-enabled device 600 were evaluated using the same functional components as in FIG. 5. The device 600 achieved a maximum reader range of about 4 cm, a load modulation amplitude of about 40.9 mV a (x,y,z) position of (0,0,0), and a field strength, of about 1.7 A/m at a distance 1 cm. Clearly, the antenna arrangement shown in FIG. 6 provides a significant improvement in each performance parameter over those of the antenna arrangement shown in FIG. 5.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A near field communication (NFC) communicator, comprising:
   a housing:
   an antenna circuit located in said housing to enable inductive coupling of a near field electromagnetic signal with another antenna circuit in near field range, said antenna circuit including an antenna element to generate the electromagnetic signal;
   an NFC controller circuit located in the housing for generating the near field electromagnetic signal, extracting data from modulation induced in the electromagnetic signal caused by the inductive coupling of the near field electromagnetic signal with another antenna circuit, and energy harvesting;
   a shielding arrangement located in the housing and disposed between the antenna element and a receiver circuit such that a gap is maintained between the antenna element and the shielding arrangement, the shielding arrangement including a high magnetic permeability sheet disposed between the antenna element and the receiver circuit; and
   a nonconductive material located between the antenna element and the high magnetic permeability sheet.

2. The NFC communicator of claim 1 wherein the nonconductive material includes a nonmetallic porous material;
wherein the high magnetic permeability sheet includes a ferrite sheet; and
wherein the nonconductive material is configured to mechanically maintain separation between the antenna element and the ferrite sheet.

3. The NFC communicator of claim 1, in which the antenna element is secured to an inner wall of the housing.

4. The NFC communicator of claim 1 wherein the high magnetic permeability sheet includes a ferrite sheet.

5. The NFC communicator of claim 4, in which the shielding arrangement further includes an EMI shielding structure mounted to the printed circuit board.

6. The NFC communicator of claim 1, in which said gap is at least 0.5 mm in width.

7. The NFC communicator of claim 2 wherein the nonmetallic porous material is secured to the antenna element.

8. The NFC communicator of claim 2 wherein the nonmetallic porous material includes a microcellular polyurethane material.

9. The NFC communicator of claim 1 further comprising a load modulator storing data that modulates a near field electromagnetic signal generated by another antenna circuit in near field range.

10. A short-range communications-enabled device, comprising:
a housing;
a radio transmitter and receiver for respectively sending and receiving RF signals over a wireless communication network;
a short-range communication component located in the housing for establishing short range communication with a second short-range enabled device that is located within short range, said short-range communication component includes an antenna element for generating an electromagnetic signal that is used to establish the short range communication and a receiver circuit for extracting information obtained from the second short-range enabled device; and
a shielding arrangement located in the housing and disposed between the antenna element and the receiver circuit such that a gap that is at least 0.5 mm in width is maintained between the antenna element and the shielding arrangement.

11. The short-range communications-enabled device of claim 10 further comprising a nonmetallic impact resistant material located in the gap and coupled to the shielding arrangement to mechanically maintain separation between the antenna element and the receiver circuit.

12. The short-range communications-enabled device of claim 10 wherein the shielding arrangement includes a ferrite sheet disposed between the antenna element and the receiver circuit; and
wherein the short-range communications-enabled device further comprises:
a nonconductive material configured to mechanically maintain separation between the antenna element and the ferrite sheet.

13. The short-range communications-enabled device of claim 10 wherein the shielding arrangement includes an EMI shielding structure mounted to the receiver circuit.

14. The short-range communications-enabled device of claim 10 further comprising a nonmetallic porous material located in the gap;
wherein the nonmetallic porous material is adhered or glued to the antenna element.

15. The short-range communications-enabled device of claim 10 further comprising a microcellular polyurethane material located in the gap.

16. A mobile communications device, comprising:
a housing;
a radio transmitter and receiver for respectively sending and receiving RF signals over a wireless communication network;
a short-range communication component located in the housing for establishing short range communication with a second short-range enabled device that is located within short range, said short-range communication component includes an antenna element for generating an electromagnetic signal that is used to establish the short range communication and at least one printed circuit board on which active electronic elements are located to process short range communication signals received from the second short-range enabled device that is located within short range;
a high magnetic permeability sheet located in the housing and disposed between the antenna element and the at least one printed circuit board; and
a nonconductive material located between the antenna element and the high magnetic permeability sheet.

17. The mobile communications device of claim 16 wherein the nonconductive material is a urethane or polyurethane foam.

18. The mobile communications device of claim 16 wherein the nonconductive material has a thickness of at least 0.5 mm.

19. The mobile communications device of claim 16 wherein the antenna element is configured to generate the RF signals used to communicate over the wireless communication network.

20. The mobile communications device of claim 16 wherein the high magnetic permeability sheet is a ferrite sheet and further comprising an EMI shielding structure mounted to the at least one printed circuit board.

* * * * *